United States Patent
Skillsäter et al.

(10) Patent No.: US 12,054,909 B2
(45) Date of Patent: Aug. 6, 2024

(54) SYSTEM AND METHOD THEREIN FOR REMOTE OPERATION OF A WORKING MACHINE COMPRISING A TOOL

(71) Applicant: VOLVO CONSTRUCTION EQUIPMENT AB, Eskilstuna (SE)

(72) Inventors: Calle Skillsäter, Torshälla (SE); Mikael Fries, Eskilstuna (SE)

(73) Assignee: VOLVO AUTONOMOUS SOLUTIONS AB, Gothenburg (SE)

( * ) Notice: Subject to any disclaimer, the term of this patent is extended or adjusted under 35 U.S.C. 154(b) by 334 days.

(21) Appl. No.: 17/571,885

(22) Filed: Jan. 10, 2022

(65) Prior Publication Data
US 2022/0228341 A1     Jul. 21, 2022

(30) Foreign Application Priority Data
Jan. 20, 2021    (EP) ..................................... 21152505

(51) Int. Cl.
*E02F 3/43*      (2006.01)
*E02F 9/20*      (2006.01)
(Continued)

(52) U.S. Cl.
CPC ............ *E02F 3/437* (2013.01); *E02F 9/2029* (2013.01); *F04B 49/065* (2013.01); *G01G 19/08* (2013.01);
(Continued)

(58) Field of Classification Search
CPC ......... E02F 3/437; E02F 9/2029; E02F 9/264; B60R 2011/004; F04B 49/005; G05B 19/0423; G01G 19/08
(Continued)

(56) References Cited

U.S. PATENT DOCUMENTS 6,247,538 B1    6/2001   Takeda et al.
6,535,793 B2*   3/2003   Allard .................. G05D 1/0044
                                         345/184
(Continued)

FOREIGN PATENT DOCUMENTS

| JP | H11-213154 A | | 8/1999 |
|---|---|---|---|
| JP | H11213154 A | * | 8/1999 |
| WO | WO 2019/151238 A1 | | 8/2019 |

OTHER PUBLICATIONS

Lundeen, et al., "Optical marker-based end effector pose estimation for articulated excavators," Automation in Construction 65 (2016) pp. 51-64.
(Continued)

*Primary Examiner* — Andrew Joseph Rudy
(74) *Attorney, Agent, or Firm* — Sage Patent Group

(57) ABSTRACT

A system and a method for remote operation of a working machine comprising a tool is provided. The system includes an on-board controller configured to receive signals from a remote control station remotely controlling the operation of the working machine, and to obtain and send camera images to an off-board controller. The system also includes an off-board controller configured to receive the camera images from the on-board controller. The off-board controller identifies at least one visual tag in the camera images located on a load carrier, determines at least one distance between the tool and the load carrier based on the identified at least one visual tag, and provides, to the on-board controller and/or to an operator of the working machine, information based on the determined at least one distance between the tool and the load carrier in order to support the remote operation of the working machine.

20 Claims, 8 Drawing Sheets

(51) Int. Cl.
    *F04B 49/06*     (2006.01)
    *G01G 19/08*     (2006.01)
    *G05B 19/042*     (2006.01)
    *B60R 11/00*     (2006.01)
    *B60R 11/04*     (2006.01)
    *E02F 9/26*     (2006.01)

(52) U.S. Cl.
    CPC .... *G05B 19/0423* (2013.01); *B60R 2011/004* (2013.01); *B60R 11/04* (2013.01); *E02F 9/264* (2013.01)

(58) Field of Classification Search
    USPC .......................................................... 701/2, 50
    See application file for complete search history.

(56) References Cited

U.S. PATENT DOCUMENTS

| | | | |
|---|---|---|---|
| 9,131,119 B2 * | 9/2015 | Friend | G01S 17/74 |
| 10,474,228 B2 * | 11/2019 | Niccolini | H04N 7/18 |
| 10,724,208 B2 | 7/2020 | Gliniorz et al. | |
| 10,850,949 B2 * | 12/2020 | Palberg | E02F 9/166 |
| 11,028,560 B2 * | 6/2021 | Taylor | E02F 3/54 |
| 11,384,515 B2 * | 7/2022 | Yoshinada | E02F 9/261 |
| 11,401,684 B2 * | 8/2022 | Berry | G05D 1/0221 |
| 11,473,270 B2 * | 10/2022 | Currier | E02F 9/205 |
| 11,486,116 B2 * | 11/2022 | Otani | H04N 5/2628 |
| 11,981,547 B2 * | 5/2024 | Minami | B66C 13/46 |
| 2015/0168136 A1 | 6/2015 | Kamat et al. | |
| 2019/0155237 A1 | 5/2019 | Kean et al. | |
| 2022/0026899 A1 * | 1/2022 | Kandula | G08C 17/02 |
| 2023/0020799 A1 * | 1/2023 | Tafazoli Bilandi | G06T 7/593 |

OTHER PUBLICATIONS

Extended European Search Report, European Patent Application No. 21152505.0, mailed Jul. 15, 2021, 8 pages.

Feng, C., et al., "Automation in Construction," Automation in Construction 96 (2018) pp. 148-160.

\* cited by examiner

SYSTEM AND METHOD THEREIN FOR REMOTE OPERATION OF A WORKING MACHINE COMPRISING A TOOL

CROSS REFERENCE TO RELATED APPLICATIONS

This application claims foreign priority to European Patent Application No. 21152505.0, filed on Jan. 20, 2021, the disclosure and content of which is incorporated by reference herein in its entirety.

TECHNICAL FIELD

Embodiments herein relate in general to remote operation of a working machine. In particular, embodiments herein relate to a system and a method for remote operation of a working machine comprising a tool.

BACKGROUND

There is a high level of complexity in setting up a remote operation of a working machine, such as, e.g. an excavator, fork lift, loader, hauler, etc., that allows an operator to control the working machine from a remote location, such as, e.g. from a control room, instead of from a driver seat of the working machine. Specifically, it is often difficult to provide the operator with a similar sense and experience of the on-premise surroundings of the working machine as the operator would have when, for example, sitting in the driver seat of the working machine overlooking and having a good view of the surroundings.

In remote operation, the operator may typically control the working machine from the remote location by looking onto one or more screens that are visualizing the surroundings of working machine via one or more image/video feeds from one or more cameras arranged on the working machine. One problem with this configuration is that it is not able to provide any real depth perception, since the image/video feeds provided is typically not able to visualize anything else than standard 2D images. This makes it hard to, for example, remotely operate a loader with a bucket full of movable loose material and properly unload the movable material onto a load carrier in a safe and efficient manner, since it will be difficult for the operator to see and determine where the bucket is actually positioned in relation to the load carrier. Hence, it will be hard for an operator to control the working machine in the most suitable way which will directly impact the productivity of the working machine.

Hence, there is need to be able to increase the sense and experience of the surroundings of the working machine to an operator operating the working machine from a remote location.

SUMMARY

It is an object of embodiments herein to improve remote operation of a working machine.

According to a first aspect of embodiments herein, the object is achieved by a system for remote operation of a working machine comprising a tool. The system comprises a remote control station comprising a work station, at least one display, and an off-board controller. Also, the system comprise an on-board controller, located on the working machine, configured to communicate with the off-board controller of the remote control station. The off-board controller or the on-board controller is configured to obtain camera images from at least one camera on the working machine. The off-board controller or the on-board controller is also configured to identify, in the obtained camera images, at least one visual tag located on a load carrier. Further, the off-board controller or the on-board controller is configured to determine at least one distance between the tool and the load carrier based on the identified at least one visual tag. The off-board controller or the on-board controller is further configured to provide, in the on-board controller and/or to an operator at the remote control station, information based on the determined at least one distance between the tool and the load carrier in order to support the remote operation of the working machine.

By using the information provided by at least one visual tag on the load carrier, the system enables a remote operator of the working machine to be provided with autonomous or semi-autonomous assistance, and/or visual information, associated with the distance between the tool of the working machine and the load carrier. This will allow the remote operator of the working machine to perform the operation of the working machine in more safe and efficient manner. Hence, remote operation of the working machine is improved.

In some embodiments, the off-board controller or the on-board controller may further be configured to obtain sensor data from at least one sensor on the working machine, and determine the at least one distance between the tool and the load carrier based on the obtained sensor data. In some embodiments, the sensor data may comprises at least one of: a tool type information, a tool width, a tool articulation in relation to a body of the working machine, and a traveling direction of the working machine.

According to some embodiments, the information provided in the on-board controller may comprise signals controlling the operation of the working machine. This enable the autonomous or semi-autonomous functions to be implemented to assist the remote operator in operation the working machine.

Optionally, for providing the information to the operator of the at the remote control station, the off-board controller or the on-board controller may, according to some embodiments, be further configured to determine at least one overlay indicating the determined at least one distance between the tool and the load carrier, and command display of the camera images together with the at least one overlay on the at least one display. In this case, according to some embodiments, the off-board controller or the on-board controller may be configured to determine the at least one overlay further based on obtained sensor data and image analysis of the camera images.

According to some embodiments, the off-board controller or the on-board controller may further be configured to determine load carrier information based on the identified at least one visual tag. In this case, the determined load carrier information may comprise one or more of: a unique identity of the load carrier, a load capacity of the load carrier, a secure loading height for the load carrier, one or more geometries of the load carrier, and the number of loads that the working machine currently has dropped onto the load carrier. Furthermore, in some embodiments, the information provided to the on-board controller may further be based on the determined load carrier information. Also, according to some embodiments, the off-board controller or the on-board controller may further be configured to determine at least one additional overlay based on the determined load carrier information, and command display of the camera images together with the at least one additional overlay on the at least one display.

According to a second aspect of embodiments herein, the object is achieved by a method for remote operation of a working machine comprising a tool. The method comprises obtaining camera images from at least one camera on the working machine. The method also comprises identifying at least one visual tag in the camera images located on a load carrier. The method further comprises determining at least one distance between the tool and the load carrier based on the identified at least one visual tag. Furthermore, the method comprise providing, in an on-board controller 121 of the working machine 120 and/or to an operator at a remote control station 110, information based on the determined at least one distance between the tool and the load carrier in order to support in the remote operation of the working machine.

Further, in some embodiments, the method may also comprise obtaining sensor data from at least one sensor on the working machine, and wherein the determining of the at least one distance between the tool and the load carrier is based on the obtained sensor data. Here, the sensor data may comprise at least one of: a tool identification information, a tool articulation in relation to a body of the working machine, and a traveling direction of the working machine.

According to some embodiments, the information in the on-board controller may comprise signals controlling the operation of the working machine. Optionally, in some embodiments, the method may further comprise determining at least one overlay indicating the at least one distance between the tool and the load carrier, and commanding display of the camera images together with the at least one overlay on the at least one display. In some embodiments, the determining of the at least one overlay may further be based on obtained sensor data and image analysis of the camera images.

According to some embodiments, the method may also comprise determining load carrier information based on the identified at least one visual tag. In some embodiments, the determined load carrier information comprise one or more of: a unique identity of the load carrier, a load capacity of the load carrier, an secure loading height for the load carrier, one or more geometries of the load carrier, and the number of loads that the working machine currently has dropped onto the load carrier. In some embodiments, the information provided in the on-board controller, may also be based on the determined load carrier information. Further, in some embodiments, the method may comprise determining at least one additional overlay based on the determined load carrier information, and commanding display of the camera images together with the at least one additional overlay on the at least one display.

According to a third aspect of the embodiments herein, the object is achieved by a computer program comprising instructions which, when executed in a processing circuitry, cause the processing circuitry to carry out the method described above. According to a fourth aspect of the embodiments herein, the object is achieved by a carrier containing the computer program described above, wherein the carrier is one of an electronic signal, optical signal, radio signal, or computer-readable storage medium.

BRIEF DESCRIPTION OF THE DRAWINGS

Features and advantages of the embodiments will become readily apparent to those skilled in the art by the following detailed description of exemplary embodiments thereof with reference to the accompanying drawings, wherein.

DETAILED DESCRIPTION

Figure 1:
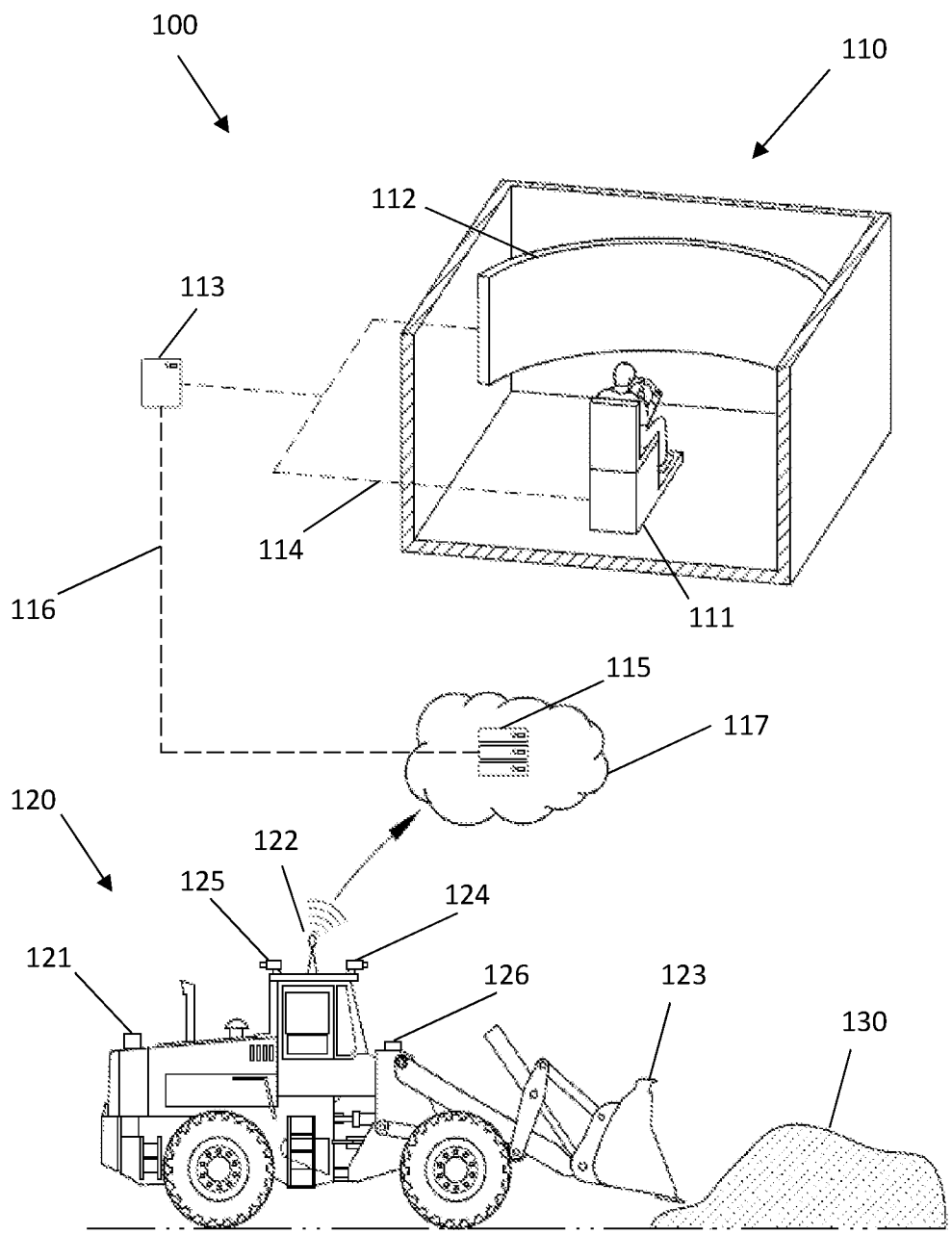
FIG. 1 is a schematic illustration of a working machine and a system for remote operation of the working machine according to some embodiments.

The figures are schematic and simplified for clarity, and they merely show details which are essential to the understanding of the embodiments presented herein, while other details have been left out. Throughout, the same reference numerals are used for identical or corresponding parts or steps.

FIG. 1 shows a system 100 for remote operation of a working machine 120 comprising a tool 121 according to some embodiments.

The system 100 comprise remote control station 110. The remote control station 110 comprise a work station 111 for an operator to remotely operate the working machine 120 and at least one display 112. The operator may provide manual input for remotely controlling the working machine 120 via the work station 111 and be provided with camera images or video feeds via the at least one display 112.

As part of the system 100, the work station 111 and the at least one display 112 of the remote control station 110 may be connected to an off-board controller 113 via a communications link 114. The off-board controller 113 may be arranged to receive the manual input from the operator of the work station 110 for remotely controlling the working machine 120. The off-board controller 113 may be connected to a communications server 115 via a communication link 116. The communications server 115 may be part of a wireless communications network 117 arranged for wireless communication over an air interface. The air interface may, for example, be provided by a telecommunications network, such as, e.g. a 3g/4g/LTE/5g/6g network or other future telecommunications networks, and/or by a local wireless network, such as, e.g. WiFi, etc. This allows the off-board controller 100 to communicate with other controllers or control units over the wireless communications network 117, for example, to provide remote control signalling.

As part of the system 100, an on-board controller 121 may arranged on the working machine 110. The on-board controller 121 located on the working machine 110 may correspondingly be configured to communicate with the off-board controller 113 over the wireless communications network 117, e.g. via an antenna 122. Thus, the on-board controller 121 may be configured to send and receive signals to and from the off-board controller 113. For example, the on-board controller 121 may receive remote control signalling from the off-board controller 113 remotely controlling the working machine 120. The on-board controller 121 may also be configured to communicate, wirelessly or by wire, with at least one camera 124, 125 and at least one sensor 126 of the working machine 120. Thus, the on-board controller 121 may be configured to obtain camera images or video feeds from the at least one camera 124, 125 on the working machine 110, and/or sensor data from at least one sensor 126 on the working machine 110. The on-board controller 121 may also be arranged to send the camera images or video feeds from the at least one camera 124, 125 to the off-board controller 113, and thus to the at least one display 112 of the remote control station 110. Optionally, the at least one camera 124, 125 and/or the at least one sensor 126 may be arranged to directly send the camera images or video feeds to the off-board controller 113. Hence, the off-board controller 113 may be configured to obtain camera images or video feeds from the at least one camera 124, 125 on the working machine 110, and/or sensor data from at least one sensor 126 on the working machine 110. In addition, the on-board controller 121 may further configured to communicate with a Global Positioning System, GPS, unit (not shown) of the working machine 120.

The working machine 120 may, for example, be an excavator, fork lift, loader, hauler, etc., or any other type of working machine. The working machine 120 may comprise a large variety of different working tools or tools 123, such as, e.g. loader buckets, buckets of different sizes, fork lifts, etc. The tool 123 may be arranged to be attached or joined to the working machine 120 and operated therefrom. In the example illustrated in FIG. 1, the working machine 120 is a loader comprising a tool 123 in the form of a bucket.

Figure 2:
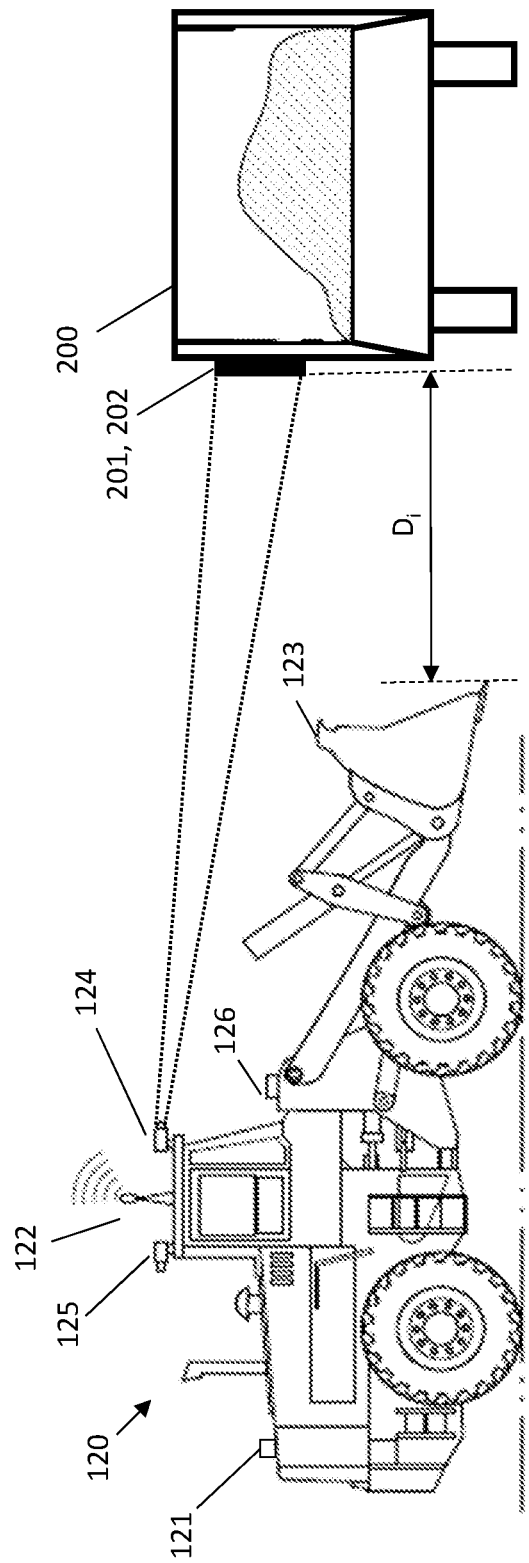
FIG. 2 is a schematic view of a working machine and a load carrier according to some embodiments.

FIG. 2 illustrates an example of the working machine 120 in front of a load carrier 200 comprising one or more visual tags 201, 202 mounted on the side of the load carrier 200. The one or more visual tags 201, 202 may have a specific pre-known form and size.

According to some embodiments, the one or more visual tags 301, 302 may be a so-called AprilTag or similar, but may also be a QR-code or similar. AprilTags, for example, are a type of fiducial marker. Fiducials, or more simply "markers," are reference objects that are placed in the field of view of a camera when an image or video frame is captured. From the image or video frame, the fiducial marker may be detected and operations based on the type of marker and where the marker is located in the input image may be performed, such as, e.g. determine the distance, position, orientation and identity of a tag relative to the location of the camera. The AprilTags normally comprise less data, such as, e.g. 4-12 bits (while QR-codes may hold up to 3 kB of data) and are made to be more robust in terms of detection range, rotation, angle, scale, lighting conditions, etc. Similar to QR-codes, the AprilTag may consist of a black square with a white foreground that has been generated in a particular pattern. They are also designed to be easily included in other applications, as well as, be portable to embedded devices.

This means that once the one or more visual tags 201, 202 comes into view of the at least one camera 124, 125 of the working machine 120, the on-board controller 121 and/or the off-board controller 113 may detect the one or more visual tags 201, 202 in the camera images or video feeds from the at least one camera 124, 125. By using the information presented by the visual tags 201, 202 and the form and size of the visual tags 201, 202 themselves, the on-board controller 121 and/or the off-board controller 113 may, for example, determine the distance, position, orientation and identity of the one or more visual tags 201, 202 relative to the mounting position of the at least one camera 124, 125 on the working machine 120. Since the mounting position of the at least one camera 124, 125 on the working machine 120 in relation to geometry of the tool 123 and the working machine 120, one or more distances, $D_i$, between the tool 123 of the working machine 120 and the load carrier 200 may be determined.

These distances, $D_i$, may then be used by the on-board controller 121 and/or the off-board controller 113 to, for example, provide signals controlling the operation of the working machine 120, i.e. perform autonomous or semi-autonomous machine operations. According to one example, the working machine 120 may be automatically stopped in case the tool 123 is about to hit the load carrier 200, i.e. the working machine 120 is driving towards the load carrier 200 without the tool 123 raised to a safe height. According to another example, the working machine 120 may automatically raise the tool 123 to a suitable height depending on one or more of the distances, $D_i$. The suitable height may here, for example, be determined based on the identified position of the one or more visual tags 201, 202 and/or height information associated with the one or more visual tags 201, 202.

Optionally, in some embodiments, the distances, $D_i$, may be used by the on-board controller 121 and/or the off-board controller 113 to, for example, determine at least one overlay 141-144 and/or at least one additional overlay 151 indicating the at least one distance between the tool 123 and the load carrier 200. Examples of how these overlays 141-144, 151 may be determined are described and shown in more detail below in reference to FIGS. 5a-5c and 6a-6b. The determined at least one overlay 141-144 and/or at least one additional overlay 151 may then be displayed to the operator of the working machine 120 together with the camera images from the at least one camera 124, 125 on the at least one display 112.

It should also be noted that, according to some embodiments, sensor data from the one or more sensors 126 may also be used in order to determine the one or more distances, $D_i$. For example, the one more sensors 126 may comprise angle, articulation and/or linkage sensors to determine an angle between the tool 123 and the working machine 120. According to another example, in case the tool 123 is detachably mounted on the working machine 120, the one more sensors 126 may comprise a tool identification sensor to determine the geometry of the tool 123 that is attached to the working machine 120. This information may also be predetermined or manually inputted by an operator remotely controlling the working machine 120. In a further example, the one or more sensors 126 may comprise sensor configured to obtain other characteristics of the working machine 120, such as, e.g. steering characteristics, etc.

Figure 3:
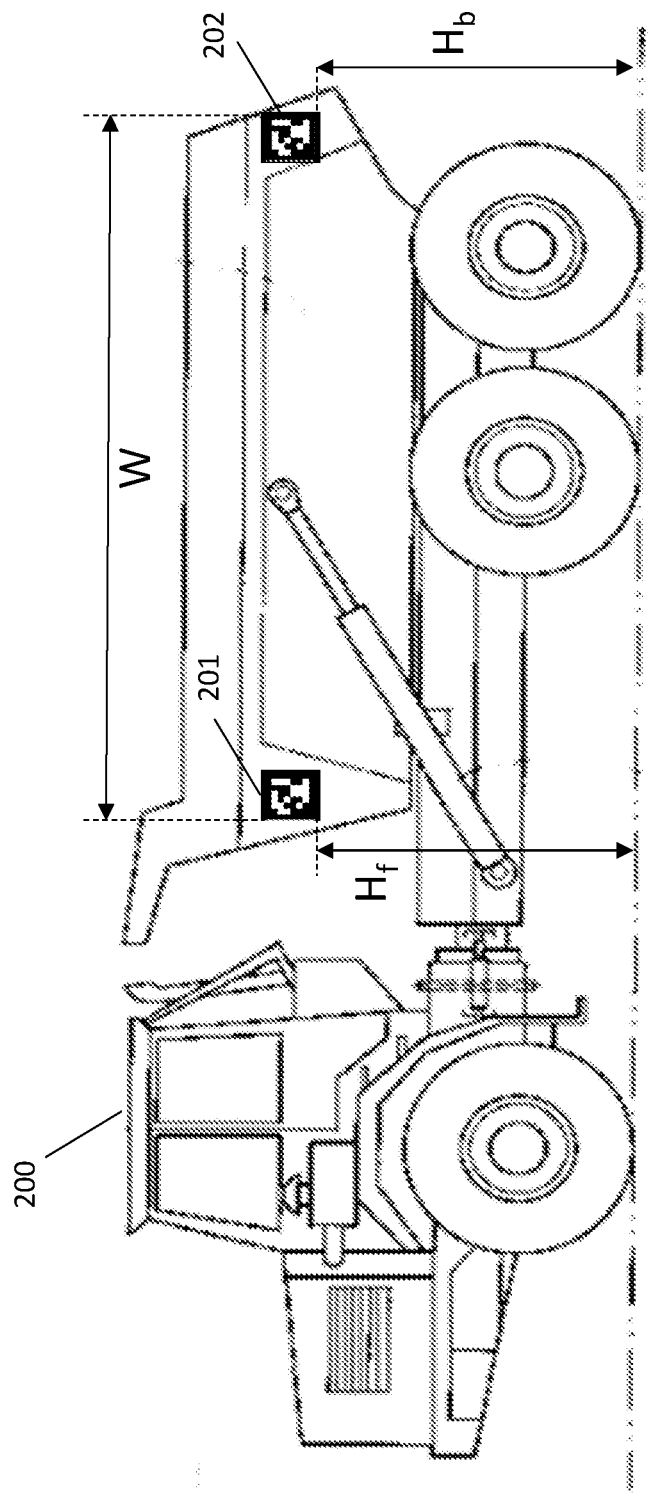
FIG. 3 is a schematic view of a load carrier according to some embodiments.

FIG. 3 illustrates side-view of the load carrier 200 comprising one or more visual tags 201, 202 mounted on the side of the load carrier 200.

In some embodiments, the one or more visual tags 201, 202 mounted on the side of the load carrier 200 may be tags specific for each load carrier 200. In this way, the system 100 may determine exactly which load carrier 200 is located in front of the working machine 120. This also means that information associated with the specific load carrier 200 may be stored in a memory, such as, e.g. a database or look-up table, and be associated with or encoded into the one or more visual tags 201, 202. The information associated with the specific load carrier 200 may, for example, be a unique identity of the load carrier 200, a specific load capacity of the load carrier 200, a specific load height of the load carrier 200, and/or various different geometry parameters related to the load carrier 200. In some embodiments, the one or more visual tags 201, 202 may also be positioned on the load carrier 200 such that the position of the one or more visual tags 201, 202 may be used to determine one or more heights of the load carrier, such as, e.g. a front height, Hf, and/or a back height, Hb, of the load carrier 200 in FIG. 3. The position of the one or more visual tags 201, 202 may also be used to indicate a specific width, W, of the load carrier 200.

Figure 4:
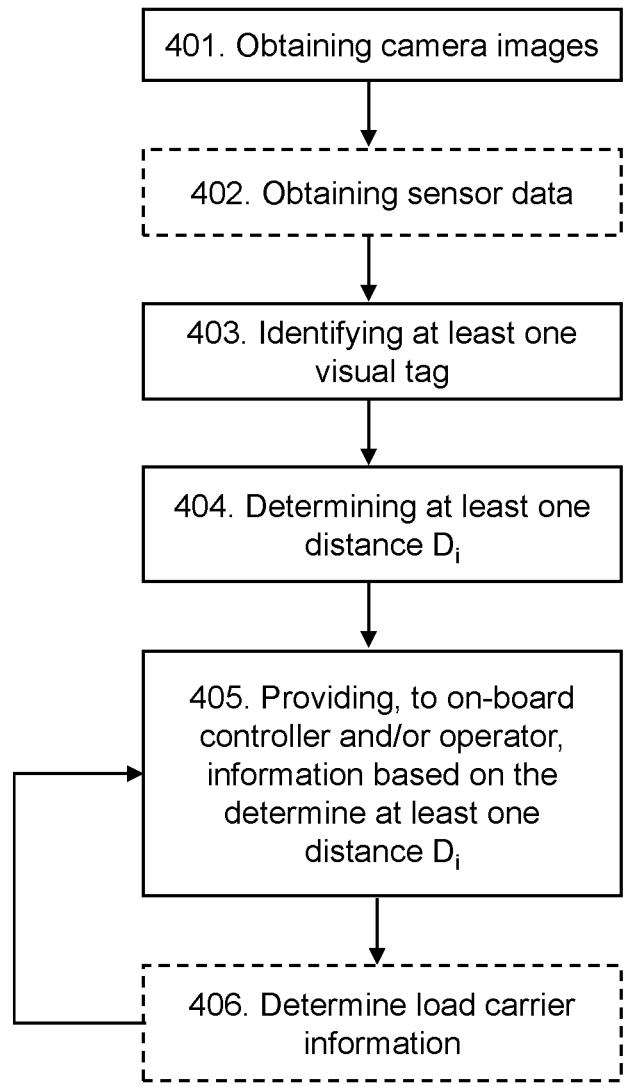
FIG. 4 is a flowchart illustrating embodiments of a method for remote operation of the working machine.

Examples of embodiments of a method for remote operation of a working machine 120 comprising a tool 123, will now be described with reference to the flowchart depicted in FIG. 4. FIG. 4 is an illustrated example of actions, steps or operations which may be performed the system 100, i.e. either by the off-board controller 113, the on-board controller 121, or a combination thereof. The method may comprise the following actions, steps or operations.

Action 401

The system 100 obtains camera images from at least one camera 124, 125 on the working machine 110. This means, for example, that the at least one camera 124, 125 on the working machine 120 may provide camera images or video feeds to the on-board controller 121. Optionally, the camera images or video feeds from the at least one camera 124, 125 may be provided directly to the off-board controller 113, or via the on-board controller 121, over the wireless communications network 117.

Action 402

Optionally, the system 100 may obtain sensor data from at least one sensor 126 on the working machine 110. This means that the on-board controller 121 or the off-board controller 113 in the system 100 may be provided with different types of sensor information associated with the operation of the working machine 120 and the surroundings of the working machine 120. According to some embodiments, the sensor data comprises at least one of: a tool identification information, a tool articulation or angle in relation to a body of the working machine 120, and a traveling direction of the working machine 120. Also, the sensor data may comprise characteristics of the working machine 120, such as, e.g. steering characteristics of the working machine 120.

Action 403

After obtaining the camera images in Action 401, the system 100 identifies at least one visual tag 201, 202 in the camera images located on a load carrier 200. This means that as the at least one visual tag 201, 202 on the load carrier 200 comes into the field of view of the at least one camera 124, 125 of the working machine 120, the on-board controller 121 or the off-board controller 113 in the system 100 will recognize and identify the at least one visual tag 201, 202 in the camera images or video feed from the at least one camera 124, 125.

Action 404

After identifying the at least one visual tag 201, 202 in Action 403, the system 100 determines at least one distance, $D_i$, between the tool 123 and the load carrier 200 based on the identified at least one visual tag 201, 202. Since the position of the at least one camera 124, 125 on the working machine 120 is known along with the geometry of the working machine 120 and any tool 123 attached thereto, the information obtained from the at least one visual tag 201, 202 relating to the distance between the at least one camera 124, 125 and the at least one visual tag 201, 202 on the load carrier 200 may be used to determine the at least one distance, Di, between the tool 123 and the load carrier 200. In some embodiments, in case sensor data was obtained in Action 402, the system 100 may also determine the at least one distance between the tool 123 and the load carrier 200 is based on the obtained sensor data. For example, in case the working machine 120 is approaching the load carrier 200 with an articulation or angle between the body of the working machine 120 and the tool 123, the articulation or angle information may also be used in determining the at least one distance, Di. The at least one distance, Di, may be determined by the on-board controller 121 or the off-board controller 113 in the system 100.

Action 405

After determining the at least one distance $D_i$, the system 100 provides, in the on-board controller 121 of the working machine 120 and/or to an operator at the remote control station 110, information based on the determined at least one distance between the tool 123 and the load carrier 200 in order to support in the remote operation of the working machine 110. This advantageously enables the system 100 to provide the on-board controller 121 with control signals for autonomous or semi-autonomous operations of the working machine 120 associated with the distance between the tool 123 of the working machine 120 and the load carrier 200. Furthermore, this also enables the system 100 to provide the operator of the working machine 120 with visual information that will assist the operator to operate the working machine 120 in a safe and efficient manner.

In some embodiments, the information provided in the on-board controller 121 may comprise signals controlling the operation of the working machine 120. This means, for example, that the information may be used by the on-board controller 121 to execute and perform autonomous or semi-autonomous operations of the working machine 120. Optionally, the information may be used by the off-board controller 113 when instructing the on-board controller 121 to execute and perform autonomous or semi-autonomous operations of the working machine 120. For example, in a scenario where the working machine 120 is remotely controlled by an operator at the remote control station 110 and the tool 123 of the working machine 120 is about to crash into or hit the load carrier 200, i.e. the driving towards the load carrier 200 without the tool 123 raised to a safe loading height of the load carrier 200, one example of such an semi-autonomous operation of the working machine 120 performed by the on-board controller 121 or the off-board controller 113 is to stop the working machine 120 or automatically raise the tool 123 to safe loading height of the load carrier 200 before the tool 123 hits the load carrier 200.

In some embodiments, the system 100 may determine at least one overlay 141-144 indicating the determined at least one distance between the tool 123 and the load carrier 200, and command display of the camera images together with the at least one overlay 141-144 on the at least one display 112. This means that, for example, that augmented or visual overlays 141-144 may be obtained by the on-board controller 121 or the off-board controller 113. This may then be presented by the on-board controller 121 or the off-board controller 113 together with the camera images from the at least one camera 124, 125 on the display 112 in order to provide support for a remote operator in operating the working machine 120 from the work station 112 at the remote control station 110. Examples of such overlays 141-144 are described and shown in more detail below in reference to FIGS. 5*a*-5*c* and 6*a*-6*b*. In some embodiments, the system 100 may determine the at least one overlay 141-144 further based on obtained sensor data and image analysis of the camera images. This means, for example, the sensor data obtained from at least one sensor 126 on the working machine 120 in Action 402 may be used to together with real-time image analysis in order to, for example, determine a relative and suitable size and position of the at least one overlay 141-144 in the camera images.

According to some embodiments, the system 100 may determine load carrier information based on the identified at least one visual tag 201, 202. This means that the on-board controller 121 or the off-board controller 113 may obtain further information regarding the load carrier 200 onto which the at least one visual tag 201, 202 is attached. In some embodiments, the determined load carrier information may comprise one or more of: an unique identity of the load carrier, a load capacity of the load carrier 200, a secure loading height for the load carrier 200, one or more geometries of the load carrier 200, and the number of loads that the working machine 120 currently has dropped onto the load carrier 200. Here, for example, load carrier information, such as, a unique identity of the load carrier 200 and/or a load capacity of the load carrier 200 may be information associated with, or encoded into, the at least one visual tag 201, 202. However, in some embodiments, other load carrier information, such as, a secure loading height for the load carrier 200 and/or one or more geometries of the load carrier 200, may be information obtained based on the identified position of the one or more visual tags 201, 202 on the load carrier 200, and/or height information associated with, or encoded into, the one or more visual tags 201, 202. Further load carrier information, such as, e.g. the number of loads that the working machine 120 currently has dropped onto the load carrier 200, may also be implemented, for example, by having a counter registering the number of times that a specific load carrier 200 has been identified at a certain distance from the working machine 120. Here, it may be assumed that the working machine 120 has dropped a load onto the load carrier 200 when located at a certain distance from a load carrier 200.

In some embodiments, the information provided in the on-board controller 121 is further based on the determined load carrier information. This means that the determined load carrier information may also be used by the on-board controller 121 when executing and performing autonomous or semi-autonomous operations of the working machine 120. In some embodiments, the system 100 may determine at least one additional overlay 151 based on the determined load carrier information, and commanding display of the camera images together with the at least one additional overlay 151 on the at least one display 112. This means that the determined load carrier information may also be used by the off-board controller 113 to obtain and present further augmented or visual overlays 151 together with the camera images on the at least one display 112 to the remote operator of the working machine 120.

Figure 5A:
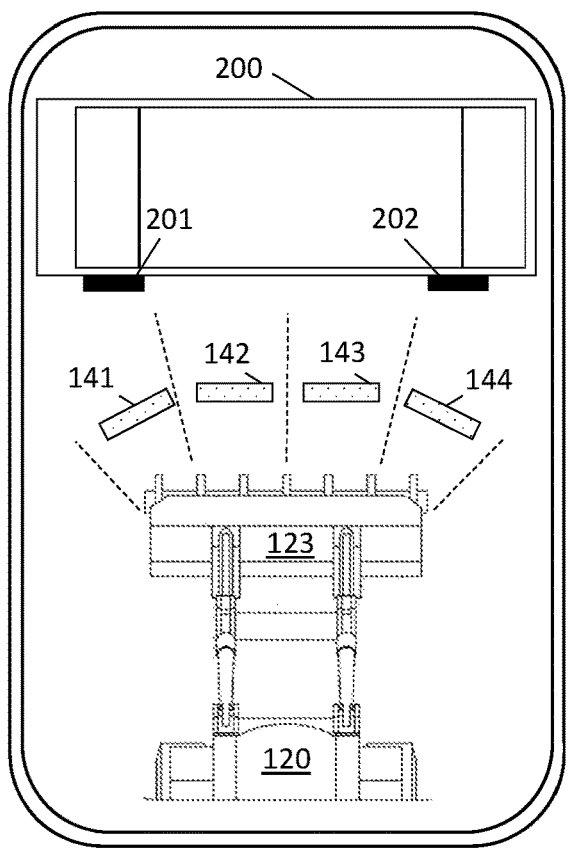
FIG. 5a-c is a schematic view of a display of camera images according to some embodiments.
Figure 5B:
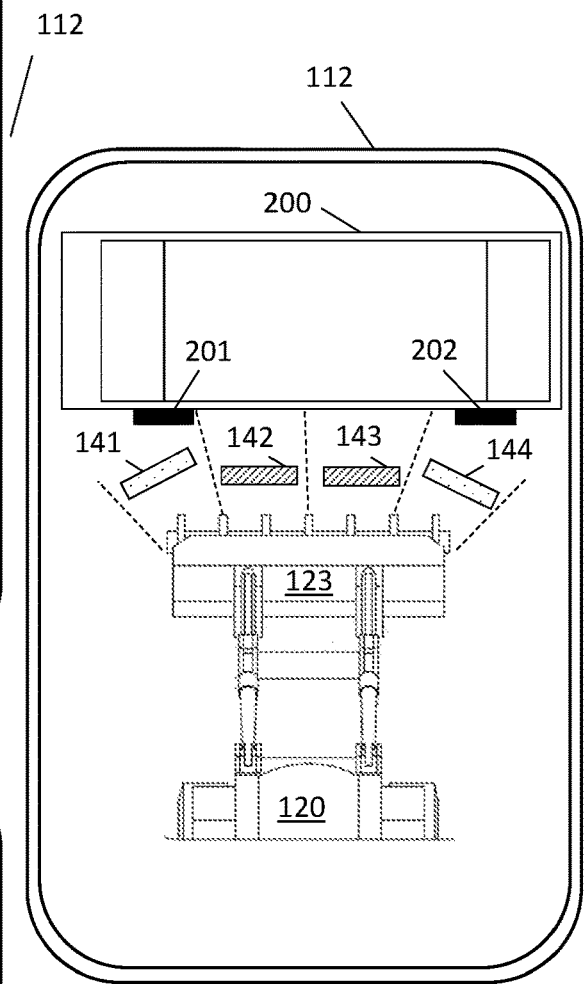
Figure 5C:
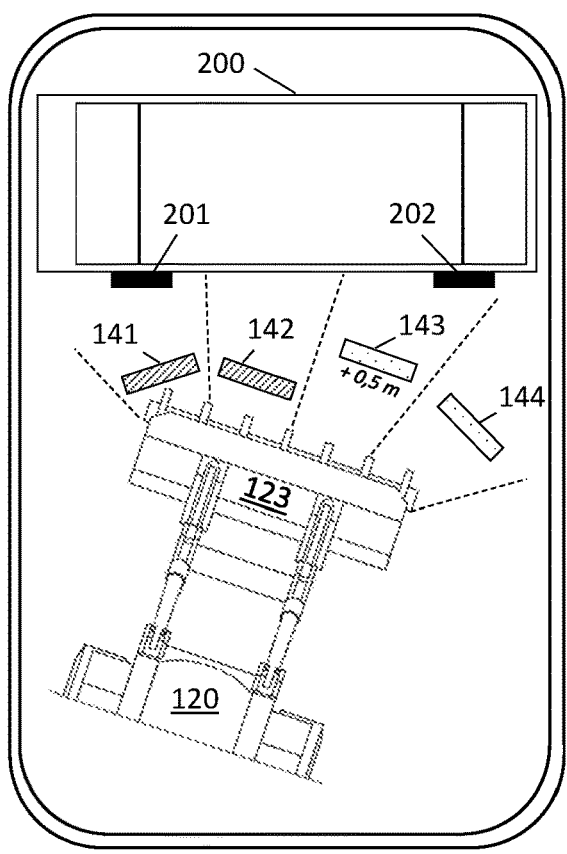

FIGS. 5a-5c illustrates an example of a display 112 of the camera images from the at least one camera 124, 125 according to some embodiments. The camera images in FIGS. 5a-5c comprise a partial view of the working machine 120, a view of the tool 123 of the working machine 120, and a partial view of the load carrier 200. Also, the camera images in FIGS. 5a-5c also display the at least one overlay 141-144.

According to one example, the at least one camera 124, 125 mounted on the remotely operated working machine 120 may send camera images or real-time video feed to an off-board controller 113 at a remote control station 110 via the on-board controller 121 and a wireless interface. In the off-board controller 113, the at least one overlay 141-144 may be inserted into the camera images or real-time video feed in order to illustrate the distance between the tool 123 of the working machine 120 and the load carrier 200 to the remote operator in the remote control station 110. For example, as illustrated in FIG. 5a, when the tool 123 of the working machine 120 is located a safe and large distance from the load carrier 200, the at least one overlay 141-144 may or may not be displayed between the tool 123 and the load carrier 200. If displayed, the at least one overlay 141-144 may comprise a specific colour indication to this effect. For example, the at least one overlay 141-144 may here e.g. be green. However, as illustrated in FIG. 5a, when the tool 123 of the working machine 120 is located an unsafe and short distance from the load carrier 200, the at least one overlay 141-144 may be displayed between the tool 123 and the load carrier 200 with specific colour indications to this effect. For example, the overlays 141-144 may here e.g. be red or yellow. For example, the overlays 141 and 144 may be yellow, while the overlays 142 and 143 indicating the closest distance between the tool 123 and the load carrier 200 may be red. Also, as the tool 123 is raised to a safe loading height of the load carrier 200, the specific colour indications of the at least one overlay may also change to visually indicate this to the remote operator of the working machine 120. Furthermore, as illustrated in FIG. 5c, the at least one overlay 141-144 may also be based on obtained sensor data, such as, the steering characteristics or steering angle of the working machine 120.

Figure 6A:
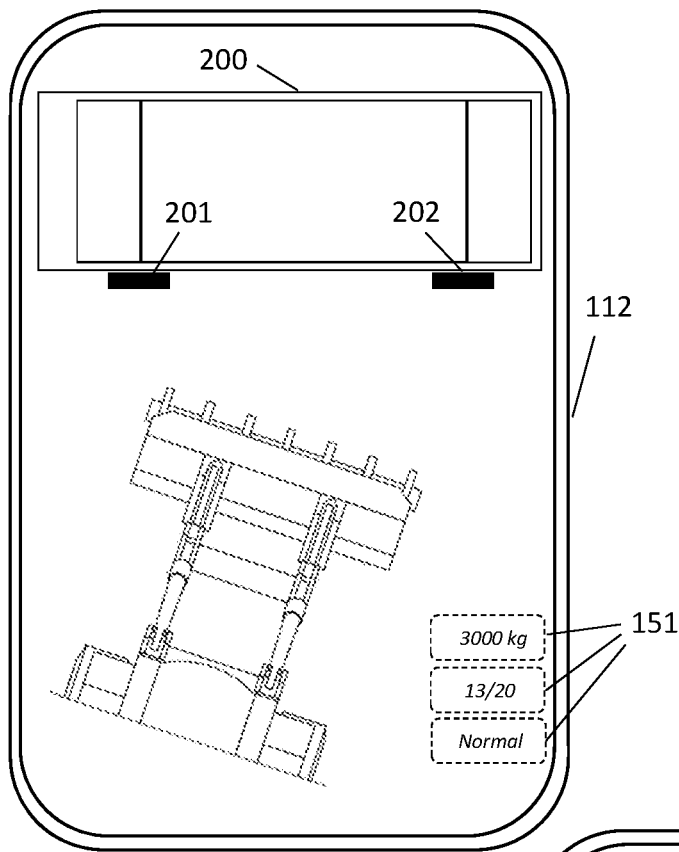
FIG. 6a-b is a schematic view of a display of camera images according to some embodiments.
Figure 6B:
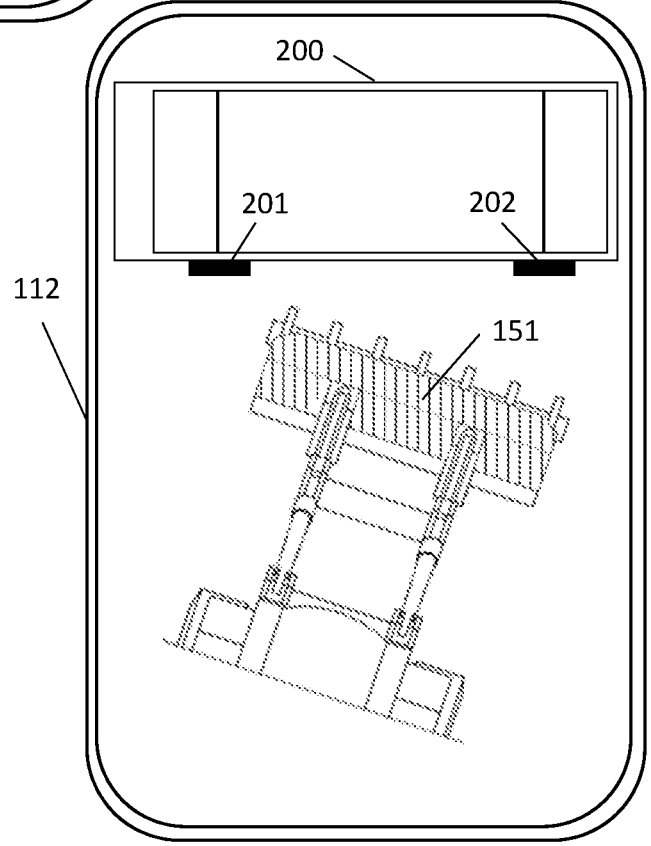

FIGS. 6a-6b illustrates another example of a display 112 of the camera images from the at least one camera 124, 125 according to some embodiments. However, the camera images in FIGS. 6a-6b here display at least one additional overlay 151. In FIG. 6a, the at least one additional overlay 151 may display information obtained based on information associated with, or encoded into, the at least one visual tag 201, 202, and/or the identified position of the one or more visual tags 201, 202 on the load carrier 200.

In FIG. 6b, the at least one additional overlay 151 may cover the tool 123 with a specific colouring and/or texture to indicate whether or not the tool 123 is raised to safe and secure loading height in view of the distance between the tool 123 of the working machine 120 and the load carrier 200 to the remote operator in the remote control station 110. For example, the at least one additional overlay 151 may turn green as soon as the tool 123 has been raised to or above a safe and secure loading height of the load carrier 200.

Figure 7:
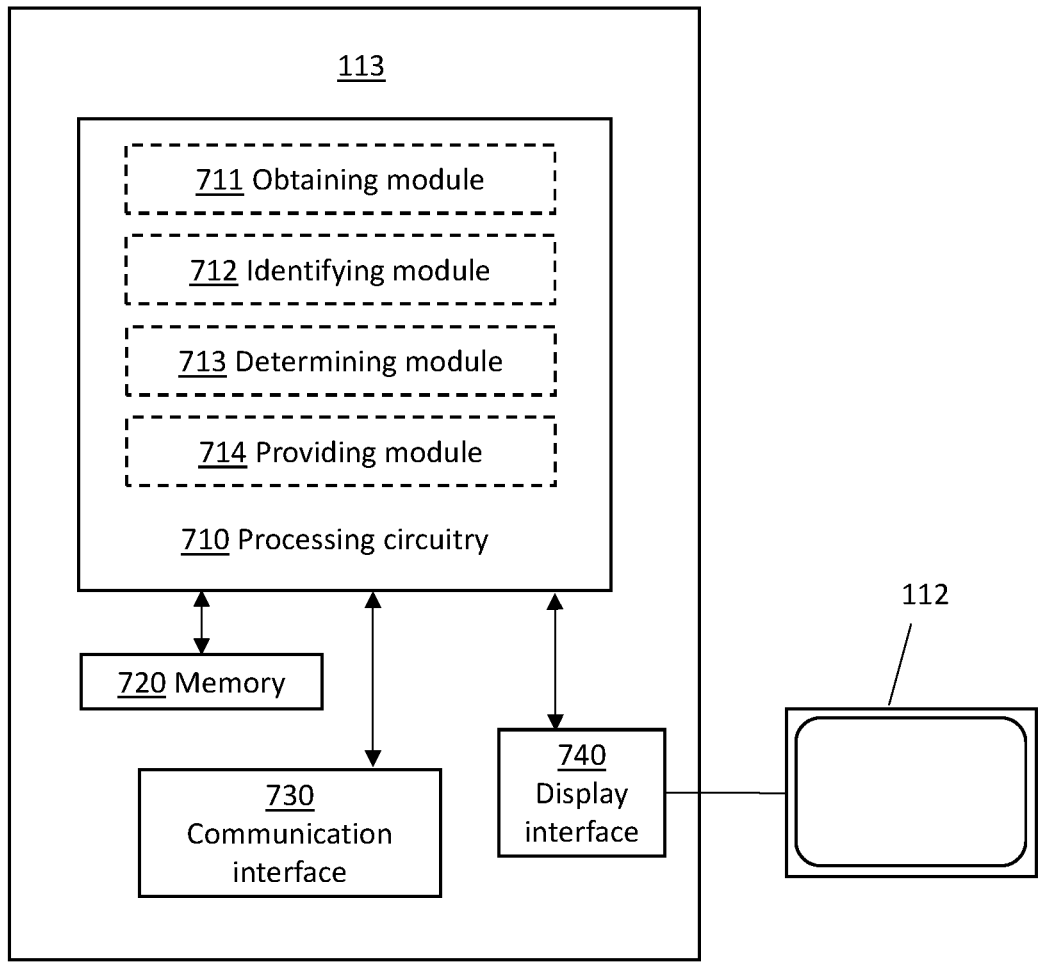
FIG. 7 is a schematic view of an off-board controller of the system according to some embodiments.

To perform the method actions for remote operation of a working machine 120 comprising a tool 123, the system 100 may comprise an off-board controller 113 having the following arrangement depicted in FIG. 7. FIG. 7 shows a schematic view of an off-board controller 113 according to some embodiments. The off-board controller 1113 may comprise a processing circuitry 710, a computer readable storage unit or memory 720, a communication interface 730, and a display interface 740. The processing circuitry 710 may be arranged to execute instructions stored in the computer readable storage unit 720.

The off-board controller 113 or processing circuitry 710 may be configured to, or may comprise an obtaining module 711 configured to, obtain camera images from at least one camera 124, 125 on the working machine 120. The off-board controller 113 or processing circuitry 710 may also be configured to, or may comprise an identifying module 712 configured to, identify, in the obtained camera images, at least one visual tag 201, 202 located on a load carrier 200. The off-board controller 113 or processing circuitry 720 is further configured to, or may comprise a determining module 713 configured to, determine at least one distance, $D_i$, between the tool 123 and the load carrier 200 based on the identified at least one visual tag 201, 202. Furthermore, the off-board controller 113 or processing circuitry 710 is further configured to, or may comprise a providing module 714 configured to, provide, in the on-board controller 121 and/or to an operator at the remote control station 110, information based on the determined at least one distance, $D_i$, between the tool 123 and the load carrier 200 in order to support the remote operation of the working machine 120.

Furthermore, the embodiments for remote operation of a working machine 110 comprising a tool 111 described above may be at least partly implemented through one or more processors, such as, the processing circuitry 710 in the off-board controller 113 depicted in FIG. 7, together with computer program code for performing the functions and actions of the embodiments herein. The program code mentioned above may also be provided as a computer program product, for instance in the form of a data carrier carrying computer program code or code means for performing the embodiments herein when being loaded into the processing circuitry 710 in the off-board controller 113. The data carrier, or computer readable medium, may be one of an electronic signal, optical signal, radio signal, or computer-readable storage medium. The computer program code may e.g. be provided as pure program code in the off-board controller 113 or on a server and downloaded to the off-board controller 113. Thus, it should be noted that the off-board controller 113 may in some embodiments be implemented as computer programs stored in memory, e.g. in the computer readable storage unit 720 in FIG. 7, for execution by processors or processing modules, e.g. the processing circuitry 710 in the off-board controller 113 of FIG. 5.

Those skilled in the art will also appreciate that the processing circuitry 710 and the computer readable storage unit 720 described above may refer to a combination of analog and digital circuits, and/or one or more processors configured with software and/or firmware, e.g. stored in a memory, that when executed by the one or more processors such as the processing circuitry 710 perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

Figure 8:
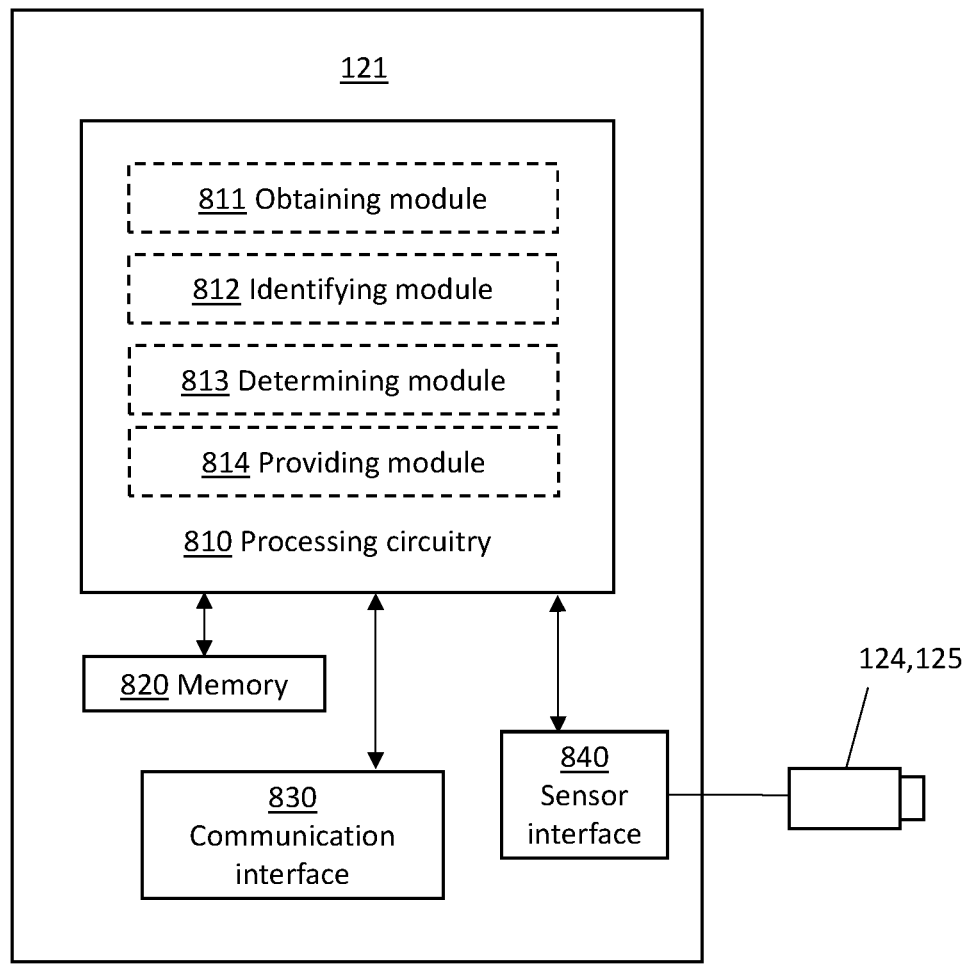
FIG. 8 is a schematic view of an on-board controller of the system according to some embodiments.

To perform the method actions for remote operation of a working machine 120 comprising a tool 123, the system 100 may comprise an on-board controller 121 having the following arrangement depicted in FIG. 8. FIG. 8 shows a schematic view of an on-board controller 121 according to some embodiments. The on-board controller 113 may comprise a processing circuitry 810, a computer readable storage unit or memory 820, a communication interface 830, and a display interface 840. The processing circuitry 810 may be arranged to execute instructions stored in the computer readable storage unit 820.

The on-board controller 121 or processing circuitry 810 may be configured to, or may comprise an obtaining module 811 configured to, obtain camera images from at least one camera 124, 125 on the working machine 120. The on-board controller 121 or processing circuitry 810 may also be configured to, or may comprise an identifying module 812 configured to, identify, in the obtained camera images, at least one visual tag 201, 202 located on a load carrier 200. The on-board controller 121 or processing circuitry 820 is further configured to, or may comprise a determining module 813 configured to, determine at least one distance, $D_i$, between the tool 123 and the load carrier 200 based on the identified at least one visual tag 201, 202. Furthermore, the on-board controller 121 or processing circuitry 810 is further configured to, or may comprise a providing module 814 configured to, provide, in the on-board controller 121 and/or to an operator at the remote control station 110, information based on the determined at least one distance, $D_i$, between the tool 123 and the load carrier 200 in order to support the remote operation of the working machine 120.

Furthermore, the embodiments for remote operation of a working machine 110 comprising a tool 111 described above may be at least partly implemented through one or more processors, such as, the processing circuitry 810 in the on-board controller 121 depicted in FIG. 8, together with computer program code for performing the functions and actions of the embodiments herein. The program code mentioned above may also be provided as a computer program product, for instance in the form of a data carrier carrying computer program code or code means for performing the embodiments herein when being loaded into the processing circuitry 810 in the on-board controller 121. The data carrier, or computer readable medium, may be one of an electronic signal, optical signal, radio signal, or computer-readable storage medium. The computer program code may e.g. be provided as pure program code in the on-board controller 121 or on a server and downloaded to the on-board controller 121. Thus, it should be noted that the on-board controller 121 may in some embodiments be implemented as computer programs stored in memory, e.g. in the computer readable storage unit 820 in FIG. 8, for execution by processors or processing modules, e.g. the processing circuitry 810 in the on-board controller 121 of FIG. 5.

Those skilled in the art will also appreciate that the processing circuitry 810 and the computer readable storage unit 820 described above may refer to a combination of analog and digital circuits, and/or one or more processors configured with software and/or firmware, e.g. stored in a memory, that when executed by the one or more processors such as the processing circuitry 810 perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

It should also be noted that the various example embodiments described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

The embodiments herein are not limited to the above described preferred embodiments. Various alternatives, modifications and equivalents may be used. Therefore, the above embodiments should not be construed as limiting.

The invention claimed is:

1. A system for remote operation of a working machine comprising a tool, the system comprises:
    a remote control station comprising a work station, at least one display, and an off-board controller, and
    an on-board controller, located on the working machine, configured to communicate with the off-board controller of the remote control station,
    characterized in that the off-board controller or the on-board controller is further configured to:
    obtain camera images from at least one camera on the working machine,
    identify, in the obtained camera images, at least one visual tag located on a load carrier,
    determine at least one distance (Di) between the tool and the load carrier based on the identified at least one visual tag, and
    provide, in the on-board controller and/or to an operator at the remote control station, information based on the determined at least one distance (Di) between the tool and the load carrier in order to support the remote operation of the working machine.

2. The system according to claim 1, wherein the off-board controller or the on-board controller is further configured to obtain sensor data from at least one sensor on the working machine, and determine the at least one distance between the tool and the load carrier based on the obtained sensor data.

3. The system according to claim 2, wherein the sensor data comprises at least one of: a tool identification information, a tool articulation in relation to a body of the working machine, and a traveling direction of the working machine.

4. The system according to claim 1, wherein the information provided in the on-board controller comprise signals controlling the operation of the working machine.

5. The system according to claim 1, wherein the off-board controller or the on-board controller is further configured to determine at least one overlay indicating the determined at least one distance between the tool and the load carrier, and command display of the camera images together with the at least one overlay on the at least one display.

6. The system according to claim 5, wherein the off-board controller or the on-board controller is further configured to determine the at least one overlay further based on obtained sensor data and image analysis of the camera images.

7. The system according to claim 1, wherein the off-board controller or the on-board controller is further configured to determine load carrier information based on the identified at least one visual tag.

8. A method for remote operation of a working machine comprising a tool, the method comprising
    obtaining camera images from at least one camera on the working machine;
    identifying at least one visual tag in the camera images located on a load carrier;
    determining at least one distance between the tool and the load carrier based on the identified at least one visual tag; and
    providing, in an on-board controller of the working machine and/or to an operator at a remote control station, information based on the determined at least one distance between the tool and the load carrier in order to support in the remote operation of the working machine.

9. The method according to claim 8, further comprising
    obtaining sensor data from at least one sensor on the working machine, and wherein the determining of the at least one distance between the tool and the load carrier is based on the obtained sensor data.

10. The method according to claim 8, wherein the sensor data comprises at least one of: a tool identification information, a tool articulation in relation to a body of the working machine, and a traveling direction of the working machine.

11. The method according to claim 8, wherein the information provided to the on-board controller comprise signals controlling the operation of the working machine.

12. The method according to claim 8, wherein the providing of information to an operator of the working machine further comprise determining at least one overlay indicating the determined at least one distance between the tool and the load carrier, and commanding display of the camera images together with the at least one overlay on the at least one display.

13. The method according to claim 12, wherein the determining of the at least one overlay is further based on obtained sensor data and image analysis of the camera images.

14. The method according to claim 8, further comprising determining load carrier information based on the identified at least one visual tag.

15. A computer program, comprising instructions which, when executed in a processing circuitry, cause the processing circuitry to carry out the method according to claim 8.

16. The computer program according to claim 15, further comprising
    obtaining sensor data from at least one sensor on the working machine, and wherein the determining of the at least one distance between the tool and the load carrier is based on the obtained sensor data.

17. The computer program according to claim 15, wherein the sensor data comprises at least one of: a tool identification information, a tool articulation in relation to a body of the working machine, and a traveling direction of the working machine.

18. The computer program according to claim 15, wherein the information provided to the on-board controller comprise signals controlling the operation of the working machine.

19. The computer program according to claim 15, wherein the providing of information to an operator of the working machine further comprise determining at least one overlay indicating the determined at least one distance between the tool and the load carrier, and commanding display of the camera images together with the at least one overlay on the at least one display.

20. The computer program according to claim 19, wherein the determining of the at least one overlay is further based on obtained sensor data and image analysis of the camera images.

* * * * *